US012657080B2

(12) United States Patent
Liu et al.

(10) Patent No.: US 12,657,080 B2
(45) Date of Patent: Jun. 16, 2026

(54) OPERATING-SYSTEM-FIRST ERROR HANDLING SYSTEM

(71) Applicant: Dell Products L.P., Round Rock, TX (US)

(72) Inventors: Wei Liu, Austin, TX (US); Scott Michael Ramsey, Cedar Park, TX (US); David Keith Chalfant, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 18/497,002

(22) Filed: Oct. 30, 2023

(65) Prior Publication Data

US 2025/0138928 A1 May 1, 2025

(51) Int. Cl.
*G06F 11/07* (2006.01)
(52) U.S. Cl.
CPC ...... *G06F 11/0772* (2013.01); *G06F 11/0793* (2013.01)
(58) Field of Classification Search
CPC ............. G06F 11/0772; G06F 11/0751; G06F 11/0787; G06F 11/3476; G06F 11/0766; G06F 11/0793
See application file for complete search history.

(56) References Cited

U.S. PATENT DOCUMENTS

| | | | |
|---|---|---|---|
| 10,776,193 B1 * | 9/2020 | Karpagavinayagam ..................... G06F 11/0793 | |
| 10,896,087 B2 * | 1/2021 | Shantamurthy ..... G06F 11/0715 | |
| 11,726,855 B1 * | 8/2023 | Hung .................. G06F 11/0787 | 714/48 |
| 2023/0009868 A1 | 1/2023 | Li | |

* cited by examiner

*Primary Examiner* — Charles Ehne
(74) *Attorney, Agent, or Firm* — Joseph Mencher

(57) ABSTRACT

An operating-system-first error handling system includes an operating system subsystem coupled to a BMC device including a shared memory subsystem, and to a reserved memory subsystem storing error handling information that is configured to direct the storage of error information in the shared memory subsystem in the BMC device. The operating system subsystem identifies a first error and generates first error information for the first error. The operating system subsystem then accesses the error handling information and, based on the error handling information, stores the first error information generated for the first error in the shared memory subsystem included in the BMC device. The operating system subsystem then notifies the BMC device of the first error information stored in the shared memory subsystem. The BMC device may then access the first error information in the shared memory subsystem and transmit the first error information to a computing device management system.

20 Claims, 12 Drawing Sheets

COMPUTING DEVICE
MANAGEMENT SYSTEM
302

NETWORK
304

COMPUTING DEVICE
306

COMPUTING DEVICE 200

BMC DEVICE 208

SHARED MEMORY SUBSYSTEM 208c

BMC ENGINE 208a

BMC DATABASE 208b

OPERATING SYSTEM ENGINE 204

OS ERROR LOG 204b

ERROR HANDLING SUB-ENGINE 204a

600

COMPUTING COMPONENTS 210

RESERVED MEMORY SUBSYSTEM 206

ERROR RECORD SERIALIZATION TABLE 502

BIOS ENGINE 212

BIOS DATABASE 214

202

COMPUTING DEVICE
306

1100

NETWORK
304

1100

COMPUTING DEVICE
MANAGEMENT SYSTEM
302

OPERATING-SYSTEM-FIRST ERROR HANDLING SYSTEM

BACKGROUND

The present disclosure relates generally to information handling systems, and more particularly to handling errors that occur in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, must "handle" errors that can occur in the computing device by anticipating, detecting, and resolving those errors. Conventional Reliability, Availability, and Serviceability (RAS) error handling is based on a "firmware-first" error handling model in which errors are handled by firmware (e.g., Basic Input/Output System (BIOS) firmware) before relinquishing control to an Operating System Platform Management (OSPM) subsystem to perform further error handling operations. For example, in response to an error in the computing device (e.g., an asynchronous machine check identified or a Peripheral Component Interconnect express (PCIe) error signaled by processor hardware), a BIOS System Management Interrupt (SMI) will be generated and will trigger a BIOS System Management Mode (SMM) in which error detection and error logging are performed by the BIOS and one of skill in the art in possession of the present disclosure will appreciate how, once the BIOS SMM is completed, that error may then be handled by an operating system Machine Check Exception (MCE) or PCIe error handler. However, such firmware-first error handling models raise issues.

For example, one of skill in the art in possession of the present disclosure will appreciate how the performance of the error detection and logging described above using the SMI and SMM raises security concerns due to such SMIs providing a common target for exploits, while also introducing performance degradation issues due to the latency associated with the SMI/SMM that scales with a number of cores in the processing system of the computing device. One conventional solution to such issues is a conventional operating-system-first error handling model that eliminates some of the issues with the firmware first error handling model described above, but introduces other issues.

For example, such operating-system-first error handling models provide for the performance of error logging via the reporting of errors via an operating system error reporting interface directly to a user of the computing device, but do not provide for the reporting of errors to computing device management systems that do not manage the operating system in the computing device. For example, computing devices provided by DELL® Inc. of Round Rock, Texas, United States may be managed by a DELL® computing device management system that does not manage the operating system on those computing devices, and the conventional operating-system-first error handling models discussed above that only report errors via the operating system error reporting interface directly to a user make it difficult for such computing device management systems to service issues that occur with computing devices being managed, honor hardware guarantees for hardware in those computing devices, and/or perform other computing device management operations known in the art because the error handling scheme and error reporting thresholds are not managed by BIOS firmware or other firmware controlled by the computing device management system.

Accordingly, it would be desirable to provide an error handling system that addresses the issues discussed above.

SUMMARY

According to one embodiment, an Information Handling System (IHS) includes a primary processing system; and a primary memory system that is coupled to the primary processing system and that includes instructions that, when executed by the primary processing system, cause the primary processing system to provide an operating system engine that is configured to: identify a first error; generate first error information for the first error; access error handling information stored in a reserved memory subsystem that is coupled to the primary processing system; store, based on the error handling information, the first error information generated for the first error in a shared memory subsystem included in a Baseboard Management Controller (BMC) device that is coupled to the primary processing system; and notify the BMC device of the first error information stored in the shared memory subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
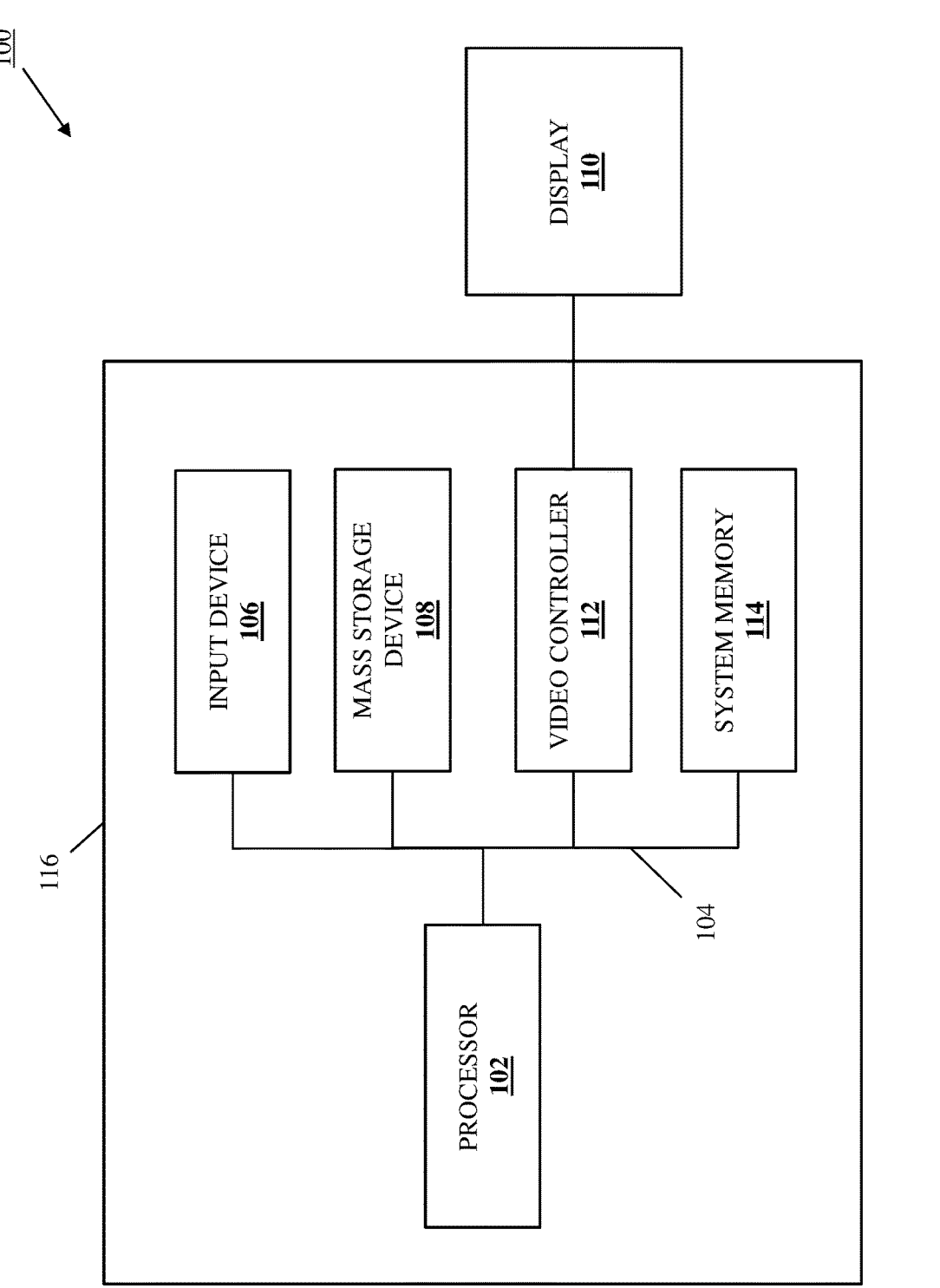
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
FIG. 2 is a schematic view illustrating an embodiment of a computing device that may include the operating-system-first error handling system of the present disclosure.

Referring now to FIG. 2, an embodiment of a computing device 200 is illustrated that may provide the operating-system-first error handling system of the present disclosure. In an embodiment, the computing device 200 may be provided by the IHS 100 discussed above with reference to FIG. 1 and/or may include some or all of the components of the IHS 100, and in specific examples may be provided by a server device, a desktop computing device, a laptop/notebook computing device, a table computing device, a mobile phone, and/or other computing devices that would be apparent to one of skill in the art in possession of the present disclosure. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a primary processing system (not illustrated, but which may include the processor 102 discussed above with reference to FIG. 1 such as, for example, a Central Processing Unit (CPU)) and a primary memory system (not illustrated, but which may include the memory 114 discussed above with reference to FIG. 1 such as, for example, Dynamic Random Access Memory (DRAM)) that is coupled to the primary processing system and that includes instructions that, when executed by the primary processing system, cause the primary processing system to provide an operating system engine 204 that is configured to provide an operating system and/or otherwise perform the functionality of the operating system engine, operating system subsystem, and/or computing device 200 discussed below. In some of the specific examples provided below, the operating system engine 204 is configured to provide an Operating System Platform Management (OSPM) subsystem/sub-engine that is configured to perform one or more of the operations of the operating system engine 204 described below, although one of skill in the art in possession of the present disclosure will appreciate how the functionality described for the operating system engine 204 may be enabled in a variety of manners that will fall within the scope of the present disclosure as well.

In the specific examples provided below, the operating system engine 204 includes an error handling sub-engine 204*a* that is configured to perform the error handling operations of the operating system engine 204 described below, and that error handling sub-engine 204*a* may be provided an operating system Machine Check Exception (MCE) error handling sub-engine/subsystem, a Peripheral Component Interface express (PCIe) uncorrected error handling sub-engine/subsystem, and/or other error handling sub-engines/subsystems that one of skill in the art in possession of the present disclosure would recognize as providing for the error handling operations described below. Furthermore, the operating system engine 204 is also described as including an operating system (OS) error log 204*b* that one of skill in the art in possession of the present disclosure will appreciate may be used by an operating system provided by the operating system engine 204 to store an error record and/or other error information as described in further detail below.

The chassis 202 may also house a reserved memory subsystem 206 is that is coupled to the operating system engine 204 (e.g., via a coupling between the reserved memory subsystem 206 and the primary processing system) and that may be provided by Double Data Rate (DDR) memory subsystem that may be reserved as described below according to the Advanced Configuration and Power Interface (ACPI) standard, and used to store error handling information that is accessible by the operating system engine 204 to provide for the error handling operations described below. As will be appreciated by one of skill in the art in possession of the present disclosure, the reserved memory subsystem 206 may be included in the memory 114 discussed above with reference to FIG. 1, and may be accessible by both an operating system provided by the operating system engine 204, as well as by the BIOS provided by the BIOS engine 212 described in further detail below.

The chassis 202 may also house a Baseboard Management Controller (BMC) device 208 that one of skill in the art in possession of the present disclosure will recognize may provide an Out-Of-Band (OOB) management platform on the computing device 200 that may use resources that are separate from the computing device 200 and provide a browser-based and/or Command-Line Interface (CLI) for managing and monitoring the computing device 200. For example, the BMC device 208 may be provided by an integrated DELL® Remote Access Controller (iDRAC) device included in computing devices provided by DELL® Inc. of Round Rock, Texas, United States, and/or other BMC devices that would be apparent to one of skill in the art in possession of the present disclosure. As such, while not illustrated in the examples provided and described below, one of skill in the art in possession of the present disclosure will recognize that the BMC device 208 may include a communication system that may be coupled to a management network in order to enable any of the network-based management operations described below.

In the specific examples illustrated and described below, the BMC device 208 includes a management processing system (not illustrated, but which may be similar to the processor 102 discussed above with reference to FIG. 1) and a management memory system (not illustrated, but which may be similar to the memory 114 discussed above with reference to FIG. 1) that is coupled to the management processing system and that includes instructions that, when executed by the management processing system, cause the management processing system to provide a BMC engine 208a that is configured to perform the functionality of the BMC engine, BMC subsystem, and/or BMC device 208 discussed below. The BMC device 208 may also include a BMC storage system (not illustrated, but which may be similar to the storage 108 discussed above with reference to FIG. 1) that is coupled to the BMC engine 208a (e.g., via a coupling between the storage system and the management processing system) and that includes a BMC database 208b that is configured to store any of the information utilized by the BMC engine 208a discussed below.

The BMC device 208 also includes a shared memory subsystem 208c that may be provided by a persistent memory subsystem such as a Serial Peripheral Interface (SPI) memory subsystem, a Double Data Rate (DDR) memory subsystem, any of a variety of software-defined memory subsystems, and/or other memory subsystem that one of skill in the art in possession of the present disclosure would recognize may be shared with the operating system engine 204 (e.g., with an operating system provided by the operating system engine 204) as described below. To provide a specific example, the shared memory subsystem 208c may be configured as a Memory-Mapped Input/Output (MMIO) memory space, although one of skill in the art in possession of the present disclosure will appreciate how the shared memory subsystem may be shared with the operating system engine 204 to enable the functionality described below using a variety of techniques that will fall within the scope of the present disclosure as well. However, while a specific BMC device 208 has been illustrated and described, one of skill in the art in possession of the present disclosure will appreciate how the functionality of the BMC device 208 described below may be provided by other devices that are configured to operate similarly to the BMC device 200 while remaining within the scope of the present disclosure as well.

The chassis 202 may also house a computing components 210 that are coupled to the operating system engine 204 (e.g., via a coupling between the computing components 210 and the primary processing system) and that may be provided by PCIe components, processors, memory devices, and/or any other computing components that one of skill in the art in possession of the present disclosure would recognize as experiencing the errors that require the error handling operations described below.

The chassis 202 may also house a Basic Input/Output System (BIOS) processing system (not illustrated, but which may be similar to the processor 102 discussed above with reference to FIG. 1 and may be provided by any of a variety of BIOS firmware processing systems that would be apparent to one of skill in the art in possession of the present disclosure) and a BIOS memory system (not illustrated, but which may be similar to the memory 114 discussed above with reference to FIG. 1 and may be provided by any of a variety of BIOS firmware memory systems that would be apparent to one of skill in the art in possession of the present disclosure) that is coupled to the BIOS processing system and that includes instructions that, when executed by the BIOS processing system, cause the BIOS processing system to provide a BIOS engine 212 that is configured to perform the functionality of the BIOS engine, BIOS subsystem, and/or computing device 200 discussed below. While not illustrated or described in detail below, one of skill in the art in possession of the present disclosure will appreciate how a communication interface (e.g., an Intelligent Platform Management Interface (IPMI) Keyboard Controller Style (KCS) direct communication interface) may be provided between the BMC engine 208a and the BIOS engine 212 (e.g., between the BIOS processing system and the management processing system), as well as how the BMC engine 208a and the BIOS engine 212 may be configured to communicate asynchronously with each other via interrupts.

The chassis may also include a BIOS storage system (not illustrated, but which may be similar to the storage 108 discussed above with reference to FIG. 1 and may be provided by any of a variety of Non-Volatile Random Access Memory (NVRAM) subsystems know in the art) that is coupled to the BIOS engine 212 (e.g., via a coupling between the BIOS storage system and the BIOS processing system) and that includes a BIOS database 214 that is configured to store any of the information utilized by the BIOS engine 212 discussed below. As will be appreciated by one of skill in the art in possession of the present disclosure, the BIOS engine 212 may be configured to provide a BIOS that operates to perform hardware initialization for hardware in the computing device 200 during an initialization process (e.g., a boot process) for the computing device 200, runtime services for an operating system (e.g., provided by the operating system engine 204) and/or applications/programs in the computing devices, and/or other BIOS functionality that would be apparent to one of skill in the art in possession of the present disclosure. However, while described as providing a BIOS, one of skill in the art in possession of the present disclosure will appreciate how the BIOS engine 212 may be replaced by a Unified Extensible Firmware Interface (UEFI) engine provided according to the UEFI specification that defines an architecture of the platform firmware used for initializing the computing device 200 and its interface for interacting with the an operating system (e.g., provided by the operating system engine 204) in the computing device 200.

Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the operating-system-first error handling functionality discussed below, while remaining within the scope of the present disclosure as well.

Figure 3:
FIG. 3 is a schematic view illustrating an embodiment of a networked system that may include the operating-system-first error handling system of the present disclosure.

Referring now to FIG. 3, an embodiment of a networked system 300 is illustrated that may include the operating-system-first error handling system of the present disclosure. In the illustrated embodiment, the networked system 300 includes a computing device management system 302. In an embodiment, the computing device management system 302 may be provided by the IHS 100 discussed above with reference to FIG. 1, and/or may include some or all of the components of the IHS 100, and in specific examples may be provided by one or more server devices. However, while illustrated and discussed as being provided by server devices, one of skill in the art in possession of the present disclosure will recognize that device provided in the system 300 may include any devices that may be configured to operate similarly as the computing device management system 302 discussed below. To provide a specific example, the computing device management system 302 may be provided and/or controlled by a computing device provider such as DELL® Inc. of Round Rock, Texas, United States, and may be utilized to manage computing devices manufactured, sold, and/or otherwise provided by DELL® Inc. to customers. However, while a specific example of the computing device management system 302 has been provided, one of skill in the art in possession of the present disclosure will appreciate how a variety of implementations of the computing device management system 302 will fall within the scope of the present disclosure as well.

In the illustrated embodiment, the computing device management system 302 is coupled to a network 304 that may be provided by a Local Area Network (LAN), the Internet, combinations thereof, and/or any other network that would be apparent to one of skill in the art in possession of the present disclosure. As illustrated, a computing device 306 is coupled via the network 304 to the computing device management system 302, and may be provided by the computing device 200 discussed above with reference to FIG. 2. However, while a specific networked system 200 has been illustrated and described, one of skill in the art in possession of the present disclosure will recognize that the operating-system-first error handling system of the present disclosure may be provided in a variety of networked systems while remaining within the scope of the present disclosure as well.

Figure 4:
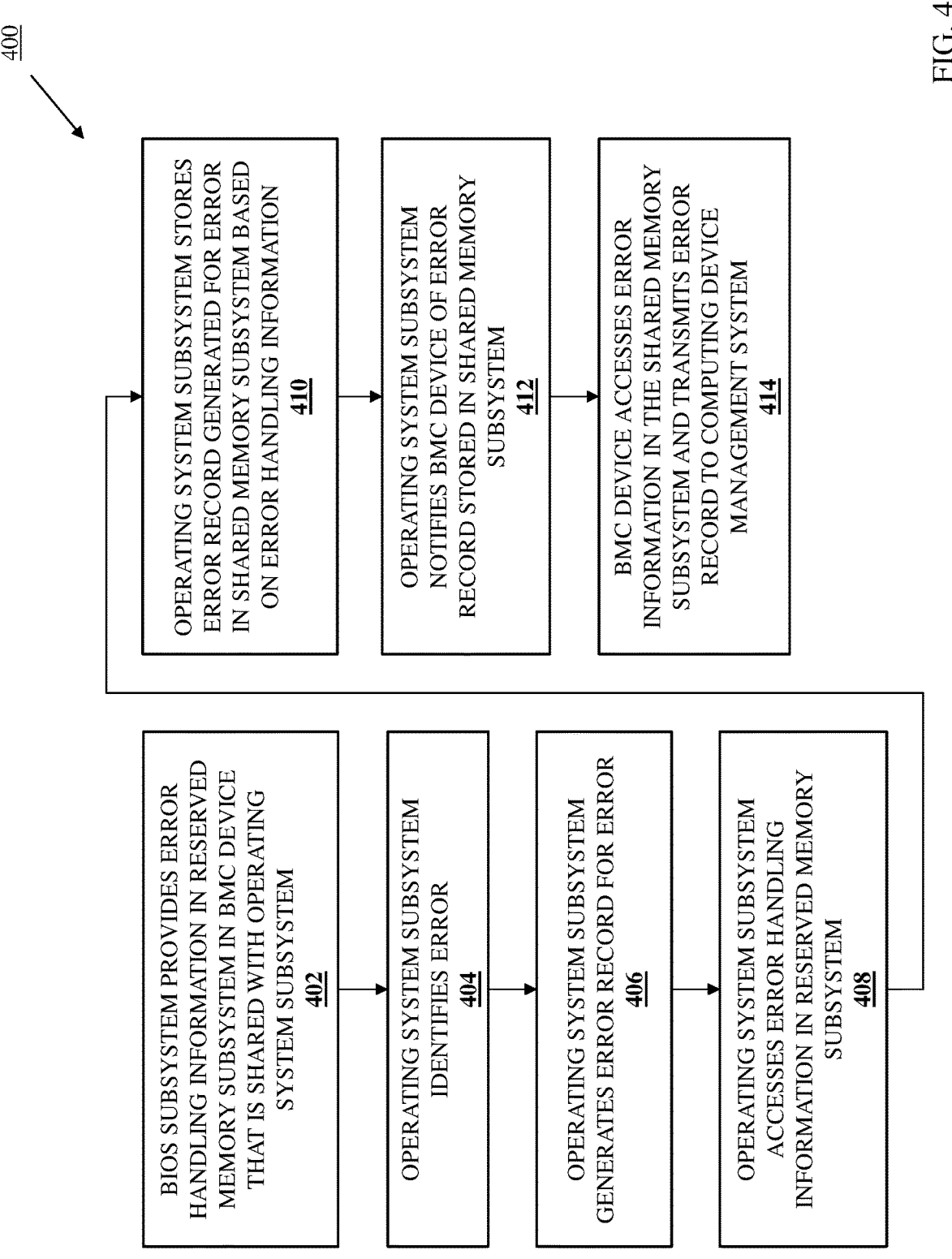
FIG. 4 is a flow chart illustrating an embodiment of a method for handling errors in a computing device.

Referring now to FIG. 4, an embodiment of a method 400 for handling errors in a computing device is illustrated. As discussed below, the systems and methods of the present disclosure provide for the handling of errors by an operating system in a manner that eliminates SMI and SMM operations performed by conventional firmware-first error handling models while also making error information available to computing device management systems. For example, the operating-system-first error handling system of the present disclosure may include an operating system subsystem coupled to a BMC device including a shared memory subsystem, and to a reserved memory subsystem storing error handling information that is configured to direct the storage of error information in the shared memory subsystem in the BMC device. The operating system subsystem identifies a first error and generates first error information for the first error. The operating system subsystem then accesses the error handling information and, based on the error handling information, stores the first error information generated for the first error in the shared memory subsystem included in the BMC device. The operating system subsystem then notifies the BMC device of the first error information stored in the shared memory subsystem. The BMC device may then access the first error information in the shared memory subsystem and transmit the first error information to a computing device management system. As such, the issues associated with the conventional firmware-first handling models and conventional operating-system-first error handling models described above are eliminated.

Figure 5:
FIG. 5 is a schematic view illustrating an embodiment of the computing device of FIG. 2 operating during the method of FIG. 4.

The method 400 begins at block 402 where a BIOS subsystem provides error handling information in a reserved memory subsystem in a BMC device that is shared with an operating system subsystem. With reference to FIG. 5, in an embodiment of block 402, the BIOS engine 212 may perform error handling information provisioning operations 500 that may include providing error handling information in the reserved memory subsystem 206. For example, during an initialization process (e.g., a Power-On Start-Up (POST)) for the computing device 200, the BIOS provided by the BIOS engine 212 may reserve a portion of the reserved memory subsystem 206 (e.g., for use as a memory-based "mailbox" as described below), may generate an Error Record Serialization Table (ERST) 502 that includes error handling information that is configured to direct the storage of an error record and/or other error information in the shared memory subsystem 208c included in the BMC device 208, and may "publish" or otherwise provide the ERST 502 in the reserved portion of the reserved memory subsystem 206. However, while specific error handling information has been described, one of skill in the art in possession of the present disclosure will appreciate how other error handling information will fall within the scope of the present disclosure as well.

As will be appreciated by one of skill in the art in possession of the present disclosure, the conventional firmware-first error handling models described above may utilize a ERST provided by a BIOS. For example, in such conventional firmware-first error handling models, an operating system may detect an error, generate an error record for that error, and then access the ERST provided by the BIOS to retrieve ERST error handling instructions (e.g., instructions for generating "save error record" requests and "get error record" requests) that point to a UEFI variable store in a BIOS SPI memory subsystem and cause the operating system to access a processor in a manner (e.g., via an Input/Output (IO) port and/or hardware register) that causes the SMI and corresponding SMM discussed above during which the BIOS stores the error record in the BIOS SPI memory subsystem. However, as described below, the ERST 502 generated by the BIOS in the operating-system-first error handling system of the present disclosure includes ERST error handling instructions (e.g., instructions to provide "save error record" requests and "get error record" requests in which the BIOS has replaced conventional action instructors with action instructors that provide for the utilization of the shared memory subsystem 208c in the BMC device 208) that cause the operating system to store error records and other error information in the shared memory subsystem 208c in the BMC device 208, thus avoiding the use of the SMI and SMM utilized in the conventional firmware-first error handling models and their associated security issues and performance degradation.

Figure 6:
FIG. 6 is a schematic view illustrating an embodiment of the computing device of FIG. 2 operating during the method of FIG. 4.

The method 400 then proceeds to block 404 where an operating system subsystem identifies an error. With reference to FIG. 6, in an embodiment of block 404, the error handling sub-engine 204a in the operating system engine 204 may perform error identification operations 600 that may include identifying any error that occurs in any of the computing components 210. For example, subsequent to the provisioning of the ERST 502 in the reserved memory subsystem 206 (e.g., during the remaining initialization of the computing device 200, following that initialization and during runtime of the computing device 200, etc.), any of the computing components 210 may experience an error, and one of skill in the art in possession of the present disclosure will recognize how an MCE error handling subsystem, a PCIe uncorrected error handling subsystem, and/or other error handling subsystem in the operating system provided by the operating system engine 204 may identify that error using any of a variety of error identification techniques known in the art.

The method 400 then proceeds to block 406 where the operating system subsystem generates an error record for the error. In an embodiment, at block 406 and in response to identifying the error at block 404, the error handling sub-engine 204a included in the operating system engine 204 may generate an error record that may include a UEFI Common Platform Error Record (CPER) format, and that may identify a Peripheral Component Interconnect address (e.g., via Bus, Device, Function (BDF) information) of a device experiencing the error, a manufacturer code for the device experiencing the error, a device code for the device experiencing the error, one or more values of supporting PCIe registers that describe the nature, origin, and/or other information about the error experienced by the device, and/or any other error information that would be apparent to one of skill in the art in possession of the present disclosure. However, while specific error information has been described, one of skill in the art in possession of the present disclosure will appreciate how a variety of error information will fall within the scope of the present disclosure as well.

Figure 7:
FIG. 7 is a schematic view illustrating an embodiment of the computing device of FIG. 2 operating during the method of FIG. 4.

The method 400 then proceeds to block 408 where the operating system subsystem accesses error handling information in the reserved memory subsystem. With reference to FIG. 7, in an embodiment of block 408 and subsequent to generating the error record and/or other error information, the error handling sub-engine 204a included in the operating system engine 204 may perform error handling information access operations 700 that include accessing ERST 502 in the reserved memory subsystem 206 and retrieving the ERST error handling instructions discussed above that are configured to provide for the storage of the error record and/or other error information in the shared memory subsystem 208c in the BMC device 208. As illustrated in FIG.

7, in some embodiments the error handling sub-engine 204a included in the operating system engine 204 may perform error record operating system storage operations 702 that include storing the error record and/or other error information generated at block 406 for the error identified at block 404 in the OS error log 204b, and as discussed above the storage of the error record and/or other error information in the OS error log 204b will render that error record and/or other error information accessible or otherwise unavailable to the computing device management system 302 discussed above with reference to FIG. 3.

Figure 8:
FIG. 8 is a schematic view illustrating an embodiment of the computing device of FIG. 2 operating during the method of FIG. 4.

The method 400 then proceeds to block 410 where the operating system subsystem stores the error record generated for the error in the shared memory subsystem based on the error handling information. With reference to FIG. 8, in an embodiment of block 410, the error handling sub-engine 204a included in the operating system engine 204 may perform error record BMC device storage operations 800 that include storing the error record and/or other error information generated at block 406 for the error identified at block 404 in the shared memory subsystem 208c in the BMC device 208 as instructed by the ERST instructions retrieved from the ERST 502 at block 408.

Figure 9:
FIG. 9 is a schematic view illustrating an embodiment of the computing device of FIG. 2 operating during the method of FIG. 4.

The method 400 then proceeds to block 412 where the operating system subsystem notifies the BMC device of the error record stored in the shared memory subsystem. With reference to FIG. 9, in an embodiment of block 412 and following the storing of the error record and/or other error information in the shared memory subsystem 208c of the BMC device 208, the error handling sub-engine 204a in the operating system engine 204 may perform error record notification operations 900 that include generating and transmitting a BMC interrupt, "mailbox traffic", and/or other notification to the BMC engine 208a in the BMC device 208 in order to notify the BMC engine 208a of the error record and/or other error information stored in the shared memory system 208c. As will be appreciated by one of skill in the art in possession of the present disclosure, the notification provided at block 412 (e.g., a BMC interrupt) will not interrupt the operation of the operating system provided by the operating system engine 204 and cause the performance degradation associated with the SMI and SMM utilized in conventional firmware-first error handling models described above, as the operating system provided by the operating system engine 204 may generate the BMC interrupt and then continue operating system operations without having to pause or otherwise wait for any associated error handling operations to complete.

Figure 10:
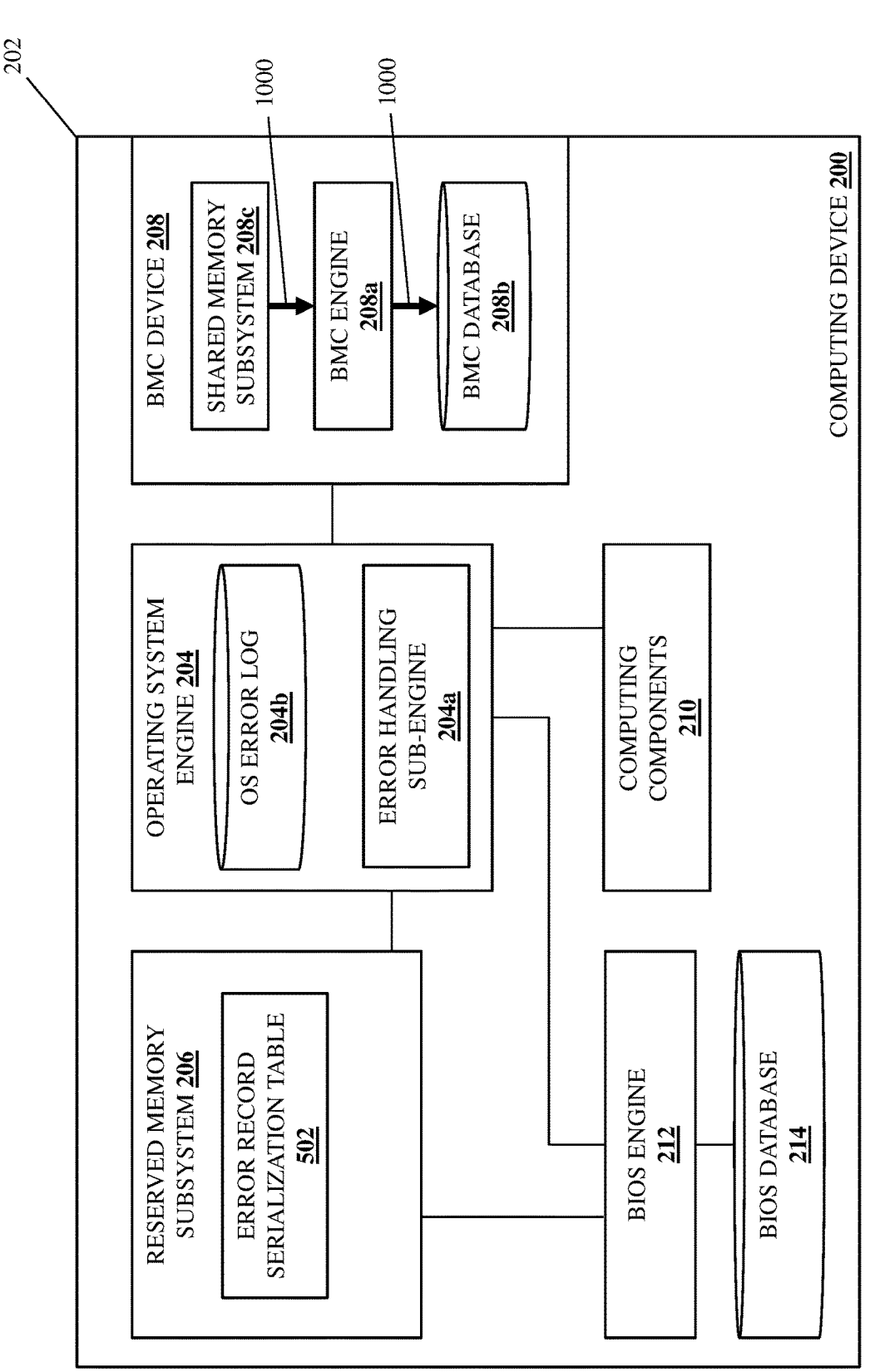
FIG. 10 is a schematic view illustrating an embodiment of the computing device of FIG. 2 operating during the method of FIG. 4.

The method 400 then proceeds to block 414 where the BMC device accesses the error record in the shared memory subsystem and transmits the error record to a computing device management system. With reference to FIG. 10, in an embodiment of block 414 and in response to being notified of the error record and/or other error information in the shared memory subsystem 208c, the BMC engine 208a may perform error record storage operations 1000 that include accessing the error record and/or other error information in the shared memory subsystem 208c and storing that error record and/or other error information in the BMC database 208b. For example, at block 414, the BMC engine 208a may retrieve the error record and/or other error information from the shared memory subsystem 208c and provide it in a Technical Support Register (TSR) that is stored in the BMC database 208b, provide it for storage in a manner that makes that error record and/or other error information available for REDFISH® log presentation operations, and/or perform any other error storage operations that would be apparent to one of skill in the art in possession of the present disclosure.

In some embodiments, the BMC engine 208*a* may operate at block 414 to supplement the error record and/or other error information retrieved from the shared memory subsystem 208*c*. For example, the error record and/or other error information stored by the operating system engine 204 in the shared memory subsystem 208*c* may not identify the computing component 210 that generated the error that resulted in that error record and/or other error information, and rather may only report an address associated with that computing component. In such situations, the BMC engine 208*a* may access a computing component/address mapping (e.g., a Field Replaceable Unit (FRU)/address mapping) to identify a computing component (e.g., an FRU) that is associated with an address identified in the error record and/or other error information, and then supplement that error record and/or other error information with information about that computing component (e.g., an FRU identifier for the FRU) in order to provide, for example, for the replacement of that computing component (e.g., replacement of an FRU).

As will be appreciated by one of skill in the art in possession of the present disclosure, in conventional firm-ware-first error handling models in which the BIOS stores error records in its NVRAM subsystem, the provisioning of those error records to a BMC device is a relatively slow process due to the relatively slow communication coupling between the BIOS and the BMC device, and operates to exacerbate the latency issues discussed above with regard to SMIs and the SMM. However, one of skill in the art in possession of the present disclosure will appreciate how the BMC interrupt by the operating system engine 204 at block 412 and subsequent error handling by the BMC engine 208*a* at block 414 eliminates such issues by eliminating the use of the SMI and SMM that introduce such latency.

Figure 11A:
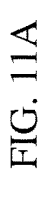
FIG. 11A is a schematic view illustrating an embodiment of the computing device of FIG. 2 operating during the method of FIG. 4.
Figure 11B:
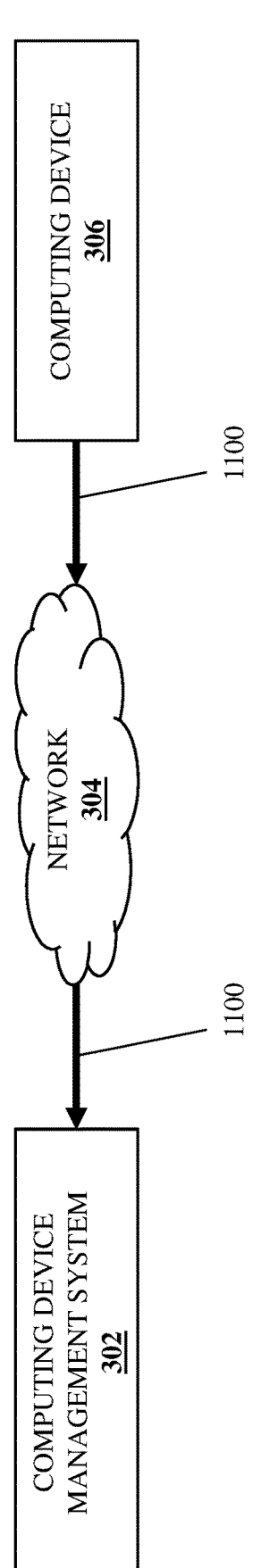
FIG. 11B is a schematic view illustrating an embodiment of the networked system of FIG. 3 operating during the method of FIG. 4.

With reference to FIGS. 11A and 11B, in an embodiment of block 414, the BMC engine 208*a* in the BMC device 208 may perform error handling information transmission opera-tions 1100 that include transmitting the error record and/or other error information from the BMC database 208*b* and via the network 304 to the computing device management system 302. As such, one of skill in the art in possession of the present disclosure will appreciate how the storage of the error handling information in the BMC database 208*b*/BMC device 208 (e.g., in a BMC error log) allows the computing device management system 302 access to that error record and/or other error information (e.g., as opposed to the inaccessible/unavailable error record and/or other error information stored in the OS error log 204*b* as described above), and thus enables associated management, support, servicing, warrantying, and/or other operations that one of skill in the art in possession of the present disclosure would recognize as being enabled via access to the error record and/or other error information for the errors occurring in the computing device 200.

Thus, systems and methods have been described that provide for the handling of errors by an operating system in a manner that eliminates SMI and SMM operations per-formed by conventional firmware-first error handling models while also making error information available to com-puting device management systems. For example, the operating-system-first error handling system of the present disclosure may include an operating system subsystem coupled to a BMC device including a shared memory subsystem, and to a reserved memory subsystem storing error handling information that is configured to direct the storage of error information in the shared memory subsys-tem in the BMC device. The operating system subsystem identifies a first error and generates first error information for the first error. The operating system subsystem then accesses the error handling information and, based on the error handling information, stores the first error information generated for the first error in the shared memory subsystem included in the BMC device. The operating system subsys-tem then notifies the BMC device of the first error informa-tion stored in the shared memory subsystem. The BMC device may then access the first error information in the shared memory subsystem and transmit the first error infor-mation to a computing device management system. As such, the issues associated with the conventional firmware-first handling models and conventional operating-system-first error handling models described above are eliminated.

Although illustrative embodiments have been shown and described, a wide range of modification, change and substi-tution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An operating-system-first error handling system, com-prising:

a Baseboard Management Controller (BMC) device including a shared memory subsystem;

a reserved memory subsystem;

a Basic Input/Output System (BIOS) subsystem that is coupled to the reserved memory subsystem and that is configured to:

generate an Error Record Serialization Table (ERST) with error handling instructions that include at least one action instructor that directs the storage of error information in the shared memory subsystem included in the BMC device; and provide the ERST in the reserved memory subsystem; and an operating system subsystem that is coupled to the BMC device and the reserved memory subsystem, wherein the operating system subsystem is configured to:

identify a first error;

generate first error information for the first error;

access the error handling instructions in the ERST provided in the reserved memory subsystem;

store, while avoiding the use of a system management interrupt or a system management mode due to the at least one action instructor included in the error handling instructions that direct the storage of error information in the shared memory subsystem included in the BMC device, the first error informa-tion generated for the first error in the shared memory subsystem included in the BMC device; and notify the BMC device of the first error information stored in the shared memory subsystem.

2. The system of claim 1, wherein the shared memory subsystem includes one of:

a Memory-Mapped BMC Interface (MMBI) memory subsystem; and a BMC Peripheral Component Interface express (PCIe) shared memory subsystem.

3. The system of claim 1, wherein the error handling instructions include instructions to provide "save error record" requests and "get error record" requests.

4. The system of claim 1, wherein the operating system subsystem is an Operating System Platform Management (OSPM) subsystem.

5. The system of claim 1, wherein the operating system subsystem is configured to identify the first error using an error handling subsystem that is included in the operating system subsystem and that is provided by one of:

an operating system Machine Check Exception (MCE) error handling subsystem; and a Peripheral Component Interface express (PCIe) uncorrected error handling subsystem.

6. The system of claim 1, wherein the BIOS subsystem is configured to:

generate the ERST and provide the ERST in the reserved memory subsystem during an initialization process.

7. The system of claim 1, wherein the BMC device is configured to:

access, in response to being notified of the first error information stored in the shared memory subsystem, the first error information; and transmit the first error information to a computing device management system.

8. An Information Handling System (IHS), comprising:

a Basic Input/Output System (BIOS) processing system; and a BIOS memory system that is coupled to the BIOS processing system and that includes instructions that, when executed by the BIOS processing system, cause the BIOS processing system to provide an BIOS engine that is configured to:

generate an Error Record Serialization Table (ERST) with error handling instructions that include at least one action instructor that directs the storage of error information in a shared memory subsystem included in a BMC device; and provide the ERST in a reserved memory subsystem that is coupled to the BIOS processing system; and a primary processing system; and a primary memory system that is coupled to the primary processing system and that includes instructions that, when executed by the primary processing system, cause the primary processing system to provide an operating system engine that is configured to:

identify a first error;

generate first error information for the first error;

access error handling instructions in the ERST provided in the reserved memory subsystem;

store, while avoiding the use of a system management interrupt or a system management mode due to the at least one action instructor included in the error handling instructions that direct the storage of error information in the shared memory subsystem included in the BMC device, the first error information generated for the first error in a shared memory subsystem included in a Baseboard Management Controller (BMC) device that is coupled to the primary processing system; and notify the BMC device of the first error information stored in the shared memory subsystem.

9. The IHS of claim 8, wherein the shared memory subsystem includes one of:

a Memory-Mapped BMC Interface (MMBI) memory subsystem; and a BMC Peripheral Component Interface express (PCIe) shared memory subsystem.

10. The IHS of claim 8, wherein the error handling instructions include instructions to provide "save error record" requests and "get error record" requests.

11. The IHS of claim 8, wherein the operating system engine is an Operating System Platform Management (OSPM) engine.

12. The IHS of claim 8, wherein the operating system engine is configured to identify the first error using an error handling sub-engine that is included in the operating system engine and that is provided by one of:

an operating system Machine Check Exception (MCE) error handling sub-engine; and a Peripheral Component Interface express (PCIe) uncorrected error handling sub-engine.

13. The IHS of claim 8, wherein the BIOS engine is configured to:

generate the ERST and provide the ERST in the reserved memory subsystem during an initialization process.

14. A method for handling errors in a computing device, comprising:

generating, by a Basic Input/Output System (BIOS) subsystem, an Error Record Serialization Table (ERST) with error handling instructions that include at least one action instructor that directs the storage of error information in a shared memory subsystem included in a BMC device; and providing, by the BIOS subsystem, the ERST in a reserved memory subsystem;

identifying, by an operating system subsystem, a first error;

generating, by the operating system subsystem, first error information for the first error;

accessing, by the operating system subsystem, error handling instructions in the ERST provided in the reserved memory subsystem;

storing, by the operating system subsystem while avoiding the use of a system management interrupt or a system management mode due to the at least one action instructor included in the error handling instructions that direct the storage of error information in the shared memory subsystem included in the BMC device, the first error information generated for the first error in a shared memory subsystem included in a Baseboard Management Controller (BMC) device that is coupled to the primary processing system; and notifying, by the operating system subsystem, the BMC device of the first error information stored in the shared memory subsystem.

15. The method of claim 14, wherein the shared memory subsystem includes one of:

a Memory-Mapped BMC Interface (MMBI) memory subsystem; and a BMC Peripheral Component Interface express (PCIe) shared memory subsystem.

16. The method of claim 14, wherein the error handling instructions include instructions to provide "save error record" requests and "get error record" requests.

17. The method of claim 14, wherein the operating system subsystem is an Operating System Platform Management (OSPM) subsystem.

18. The method of claim 14, wherein the operating system subsystem identifies the first error using an error handling subsystem that is included in the operating system subsystem and that is provided by one of:

an operating system Machine Check Exception (MCE) error handling subsystem; and a Peripheral Component Interface express (PCIe) uncor-
rected error handling subsystem.

19. The method of claim 14, wherein the BIOS) subsys-
tem generates the ERST and provides the ERST in the reserved memory subsystem
during an initialization process.

20. The method of claim 14, further comprising:

accessing, by the BMC device in response to being
notified of the first error information stored in the
shared memory subsystem, the first error information;
and transmitting, by the BMC device, the first error informa-
tion to a computing device management system.

\* \* \* \* \*